United States Patent
Bolin et al.

(10) Patent No.: US 12,122,677 B2
(45) Date of Patent: Oct. 22, 2024

(54) METHOD OF MANUFACTURING A GRAPHENE/GRAPHEHE OXIDE LAYER AND A GRAPHENE/GRAPHEHE OXIDE-COATED SUPPORT

(71) Applicant: AHLSTROM OYJ, Helsinki (FI)

(72) Inventors: Göran Bolin, Stockholm (SE); Erkki Laiti, Pont-Evêque (FR); Eric Rousset, Pont-Evêque (FR)

(73) Assignee: AHLSTROM OYJ, Helsinki (FI)

( * ) Notice: Subject to any disclaimer, the term of this patent is extended or adjusted under 35 U.S.C. 154(b) by 1082 days.

(21) Appl. No.: 16/970,369

(22) PCT Filed: Feb. 15, 2019

(86) PCT No.: PCT/EP2019/053849
§ 371 (c)(1),
(2) Date: Aug. 16, 2020

(87) PCT Pub. No.: WO2019/158707
PCT Pub. Date: Aug. 22, 2019

(65) Prior Publication Data
US 2021/0009425 A1    Jan. 14, 2021

(30) Foreign Application Priority Data

Feb. 16, 2018 (SE) .................................. 1850174-2

(51) Int. Cl.
| | | |
|---|---|---|
| *C01B 32/184* | (2017.01) | |
| *C01B 32/198* | (2017.01) | |
| *D21H 13/50* | (2006.01) | |
| *D21H 19/12* | (2006.01) | |
| *D21H 19/38* | (2006.01) | |
| *B82Y 30/00* | (2011.01) | |
| *B82Y 40/00* | (2011.01) | |

(52) U.S. Cl.
CPC .......... *C01B 32/184* (2017.08); *C01B 32/198* (2017.08); *D21H 13/50* (2013.01); *D21H 19/12* (2013.01); *D21H 19/385* (2013.01); *B82Y 30/00* (2013.01); *B82Y 40/00* (2013.01)

(58) Field of Classification Search
CPC ........................... C01B 32/184; C01B 32/198
See application file for complete search history.

(56) References Cited

U.S. PATENT DOCUMENTS

| | | |
|---|---|---|
| 2011/0088931 A1 | 4/2011 | Lettow |
| 2011/0281034 A1 | 11/2011 | Lee |
| 2014/0272199 A1 | 9/2014 | Lin et al. |
| 2014/0299475 A1* | 10/2014 | Bullington ............... C23C 18/36 205/109 |
| 2015/0284253 A1 | 10/2015 | Zhamu et al. |
| 2017/0016229 A1 | 1/2017 | Cossette et al. |
| 2017/0021387 A1 | 1/2017 | Lin et al. |
| 2017/0317336 A1 | 11/2017 | Zhamu et al. |
| 2017/0352869 A1 | 12/2017 | Zhamu et al. |
| 2018/0128335 A1* | 5/2018 | Sin Xicola ............. F16D 69/026 |

FOREIGN PATENT DOCUMENTS

| | | |
|---|---|---|
| CA | 2997796 A1 | 3/2017 |
| CN | 103482621 A | 1/2014 |
| WO | 2014/117434 A1 | 8/2014 |
| WO | 2015/133849 A1 | 9/2015 |
| WO | 2017/013263 A1 | 1/2017 |
| WO | 2018/018655 A1 | 2/2018 |

OTHER PUBLICATIONS

Bo Yang et al., "Qualitative analysis of reduction degree in reduced graphene oxide solution by femtosecond laser-induced breakdown spectroscopy", IOP Conf. Series: Materials Science and Engineering, vol. 382, 2018; 8 pages.
Kazi et al., "Investigation on the use of graphene oxide as novel surfactant to stabilize weakly charged graphene nanoplatelets", Nanoscale Research Letters, vol. 10, No. 212; 2015; 15 pages.
Barberio et al., Laser-Plasma Driven Synthesis of Carbon-Based Nanomaterials, Scientific Reports, Sep. 20, 2017, 7: 12009.
International Search Report for International Application No. PCT/EP2019/053849; International Filing Date Feb. 15, 2019; Date of Mailing May 23, 2019; 3 pages.
Written Opinion for International Application No. PCT/EP2019/053849; International Filing Date Feb. 15, 2019; Date of Mailing May 23, 2019; 6 pages.
"European list of corrugated base papers"; Cepi ContainerBoard, 5th Edition; 2017; pp. 1-22.
"Graphene"; Wikipedia; Retrieved from https://en.wikipedia.org/w/index.php?title=Graphene&oldid=1040264640; pp. 1-63.
Kumar et al.; "Conductive nanographite-nanocellulose coatings on paper"; Flexible and Printed Electronics, vol. 2; 2017; pp. 1-11.
Third Party Observation for EP Application No. 19706497.5; Received Sep. 23, 2021; 6 pages.
Kowalczyk et al., "Modification of cotton fabric with graphene and reduced graphene oxide using sol-gel method", Cellulose, vol. 24, 2017; pp. 4057-4068.

* cited by examiner

*Primary Examiner* — Stuart L Hendrickson
(74) *Attorney, Agent, or Firm* — CANTOR COLBURN LLP

(57) ABSTRACT

There is provided a method of manufacturing a graphene/graphene oxide layer comprising the steps of: providing a suspension of graphene/graphene oxide in a suspension liquid, applying the suspension on a support, heating the suspension and the support to evaporate liquid to form a layer of graphene/graphene oxide on the support, subjecting the graphene/graphene oxide layer and the support to pressure, and subjecting the graphene/graphene oxide layer to annealing process.

16 Claims, 1 Drawing Sheet

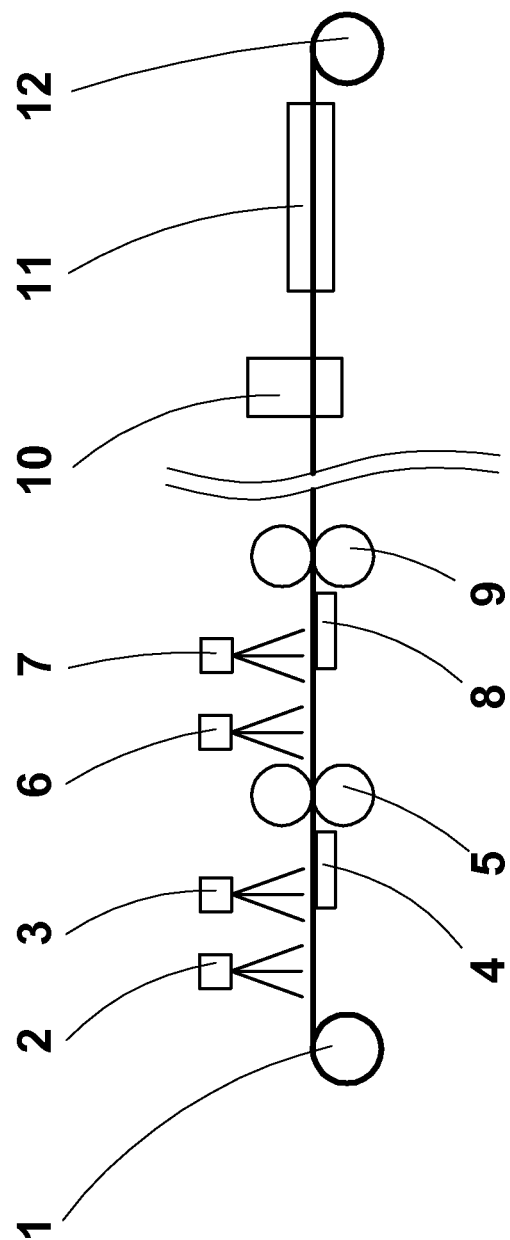

METHOD OF MANUFACTURING A GRAPHENE/GRAPHEHE OXIDE LAYER AND A GRAPHENE/GRAPHEHE OXIDE-COATED SUPPORT

PRIORITIES AND CROSS REFERENCES

This Application claims priority from International Application No. PCT/EP2019/053849 filed on 15 Feb. 2019 and Swedish Application No. 1850174-2 filed on 16 Feb. 2018, the teachings of each of which are incorporated by reference herein in their entirety.

TECHNICAL FIELD

The present invention relates to a method of manufacturing a graphene/graphene oxide layer, to a method of manufacturing a graphene/graphene oxide-coated paper and a graphene/graphene oxide-coated paper.

BACKGROUND

Barberio et al in Nature Scientific Reports (7):12009 discloses production of graphene flakes using laser.

WO 2018/018655 discloses a method for surface strengthening comprising the steps of applying graphene or graphene oxide to a surface as an absorption layer, applying optical glass or silica gel as a constraining layer thereon, and treating with pulsed laser light. The laser beam is irradiated onto the absorption layer through the constraining layer; the absorption layer absorbs the laser energy to rapidly creating high temperature and high pressure plasma. According to the description the rapid expansion of the plasma creates a high-intensity shock wave and the shock wave presses a part of the coating onto the surface, increasing the adhesion.

Regarding graphene it is desirable to manufacture it in a large scale at a reasonable cost. Further a graphene/graphene oxide layer which is continuous is desired.

SUMMARY

It is an object of the present invention to obviate at least some of the disadvantages in the prior art and provide an improved method of manufacturing a graphene/graphene oxide layer.

It is another object of the present invention to obviate at least some of the disadvantages in the prior art and provide an improved method of manufacturing graphene/graphene oxide-coated support.

In a first aspect of the present invention there is provided a method of manufacturing a graphene layer comprising the steps of:
 a) preparing a suspension of graphene/graphene oxide in a suspension liquid,
 b) applying the suspension on a support,
 c) heating the suspension and the support to evaporate at least a part of the suspension liquid for forming a layer of graphene/graphene oxide on the support,
 d) subjecting the graphene/graphene oxide layer and the support to pressure.

In a second aspect of the present invention, before or in connection with step b), as step b1), a graphene bonding liquid is applied on the support and, in step c), at least a part of the graphene bonding liquid is evaporated.

In a third aspect of the present invention the graphene/graphene oxide layer is subjected, in step c), to heat from a non-contact or contact heat source.

In a fourth aspect of the present invention the graphene/graphene oxide layer is subjected, in step e), to an annealing step to heat the graphene/graphene oxide layer.

In a fifth aspect of the present invention a graphene/graphene oxide coated support is manufactured according to the method described above, wherein the support is paper.

In a sixth aspect of the present invention at least a part of residual surface contaminants are removed in step c), Further aspects and embodiments of the present invention are defined in the appended claims, which are specifically incorporated herein by reference.

One advantage is that a graphene/graphene oxide coating is obtained, which has few seams. An almost continuous graphene/graphene oxide layer could be obtained in one embodiment.

One advantage is that the material is inexpensive to manufacture in large scale.

The process makes it possible to fine-tune the quality of the graphene/graphene oxide coating according to the needs and thereby to optimize the cost.

BRIEF DESCRIPTION OF THE DRAWING

The invention is now described, by way of example, with reference to the accompanying drawing, in which:

FIG. 1 shows a schematic representation of a preferred embodiment of the method in accordance with the present invention where graphene/graphene oxide is applied on paper. The reference numeral 1 stands for a paper roll, from where the paper is, preferably, but not necessarily, taken on a support of a wire or a table (not shown). The reference numeral 2 stands for the optional application of graphene bonding liquid on the paper, reference numeral 3 the application of graphene/graphene oxide suspension on the paper, reference numeral 4 heating of the graphene/graphene oxide suspension and the paper by means of a non-contact or contact heat source to evaporate liquid to form a layer of graphene/graphene oxide on the paper, reference numeral 5 calendering of the graphene/graphene oxide layer and the paper, optionally with heat treatment, reference numeral 6 repeated and optional application of graphene bonding liquid on the paper, reference numeral 7 repeated application of graphene/graphene oxide suspension on the paper, reference numeral 8 repeated heating of the graphene/graphene oxide suspension and the paper by means of a non-contact or contact heat source to evaporate liquid to form a layer of graphene/graphene oxide on the paper, reference numeral 9 repeated calendering of the graphene/graphene oxide layer and the paper, optionally with heat treatment, reference numeral 10 applying heat, optionally by applying an annealing process, to the graphene/graphene oxide layer and at the same time, optionally, cooling the paper so that damage to the paper is avoided, i.e. the temperature of the paper is kept below 250° C., reference numeral 11 optionally cooling of the graphene/graphene oxide-coated paper, and reference numeral 12 reeling finished graphene/graphene oxide-coated paper on a roll.

With regard to the heating and drying steps 4 and 8, it should be understood that they are schematically presented in the Figure. In practice, the coating is dried with a combination of different contact or non-contact driers according to desired drying profile. The non-contact drier is the preferred alternative. Preferably, the heating is performed by means of a non-contact heat source, placed above the paper so that the heat is directed onto the coated side of the paper.

DETAILED DESCRIPTION

Before the invention is discussed and described in detail, it is to be understood that this invention is not limited to particular compounds, configurations, method steps, substrates, and materials discussed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

It must also be noted that with the phrase "graphene/graphene oxide" is here meant either graphene, graphene oxide or a mixture thereof.

If nothing else is defined, any terms and scientific terminology used herein are intended to have the meanings commonly understood by those of skill in the art to which this invention pertains.

In the beginning of the production process a suspension is formed of a suspension liquid and graphene/graphene oxide particles. The suspension liquid is preferably water, though also water with surface additives may be used. Other suitable suspension liquids include organic solvents such as N-Methyl-pyrrolidone, Dimethylformamide, just to name a few alternatives without any intention of limiting the present invention to the listed options. The suspension comprises small particles of graphene/graphene oxide. In one embodiment the particles are shaped as flakes. Graphene particles are generally produced by separating layers of graphene from their parent compound, graphite. A common method for this separation of graphene layers is referred to as exfoliation, and during the exfoliation process of graphite, several layers of graphene are separated from the massive number of weakly bound graphene layers which constitute graphite. Various production techniques, in additional to other factors, determine the total number of layers in graphene particles, therefore the number of layers present in the graphene particles will be variable. Nonetheless, the graphene particles still contain a vastly reduced number of layers compared to that of graphite. Each one of the graphene particles does not necessarily comprise a monolayer of graphene, but each particle may instead comprise a plurality of graphene layers. The term graphene is also used to denote several layers of graphene.

The term graphene oxide is used to describe an oxidized form of graphene containing oxygen-containing groups such as epoxide, carbonyl, carboxyl, and hydroxyl groups. The ratio of carbon to oxygen varies depending on the level of oxidation, which varies according to production method and subsequent treatment processes, such as reduction of graphene oxide. Much like graphene, exfoliation of graphite oxide is a common route to obtain graphene oxide particles, and therefore—not only the degree of oxidation—but the number of layers can vary according to manufacturing method as well as other factors. Nonetheless, the graphene oxide particles still contain a vastly reduced number of layers compared to that of graphite oxide. Each one of the particles does not necessarily comprise a monolayer of graphene oxide, but each particle may instead comprise a plurality of graphene oxide layers. The term graphene oxide is used to denote several layers of graphene oxide.

In one embodiment the suspension is created by the dispersion of exfoliated graphene/graphene oxide particles in a suspension liquid. Dispersion of graphene/graphene oxide molecules can be achieved by application of external energy to the mixture most commonly with high-shear mixers, for example a rotor-stator mixer, treatment with ultrasound, for example a ultrasound probes or ultrasonic homogenizers, or other techniques known to persons skilled in the art, for example milling or high pressure homogenization. In a suspension of graphene/graphene oxide particles, reduction of particle size and size distribution, through breakup of agglomerates and greater exfoliation is not easily attainable, but can be achieved using high shear mixing and/or ultrasonic probes. After achieving a suspension of highly exfoliated graphene/graphene oxide particles, however, suspension stability may still be problematic as the particles are drawn back together through intermolecular forces and begin to agglomerate once again. Therefore, without additional treatment to the suspension, graphene and/or graphene oxide particles having a diversity of particle sizes and number of layers will gradually emerge.

The graphene/graphene oxide suspension may contain graphene, graphene oxide, or mixtures thereof, in a suspension liquid. The concentration of graphene, graphene oxide, or the mixture of graphene and graphene oxide in the suspension may be prepared in concentration up to about 15% by weight. High concentrations may present challenges such as undesired agglomeration of graphene/graphene oxide (undesirable re-stacking of layers), increased viscosity, and lower suspension stability (rapid sedimentation, for example).

To provide a more desirable suspension—in particular, a more stable suspension—the graphene and/or graphene oxide suspension quality may be improved by the addition of binders, co-binders, solvents/co-solvents as well as additives such as dispersants, surfactants, stabilizers, rheology modifiers, water retention aids, lubricants and insolubilizes, plasticizers, preservatives, anti-foams, dyes etc. into the suspension liquid.

Surfactants, or surface active agents, can play a role in stabilizing the suspension, maintaining separation of exfoliated graphene and/or graphene oxide layers, or even promoting additional exfoliation of layers under certain circumstances. Examples of surfactants and stabilizers include ionic, non-ionic, and zwitterionic surfactants, for example sodium dodecyl sulfate (SDS), sodium dodecylbenzylsulfonate (SDBS), sodium cholate, sodium taurodeoxycholate, dodecyltrimethyl ammonium bromide (DTAB), pyrene, pyrene-derivatives, Triton X-100, Tween 20, polyvinylpyrrolidone (PVP), ethyl cellulose, acrylic polymer, Pluronic® P-123, Pluronic® F-108.

Rheology modifiers may, on their part, include, without going into their chemical composition, synthetic thickeners and water retention aids as well as natural thickeners and water retention aids (such as nanofibrillated cellulose), co-binders may also have a rheology modifier function.

To be applied to the substrate, the graphene/graphene oxide suspension must possess certain characteristics suitable to the substrate. Properties that make the graphene/graphene oxide suspension suitable for application to the substrate include stability of the suspension used in the process, rheology/viscosity and surface tension.

As to stability of the graphene/graphene oxide suspension used in the process, there should be no or very little phase separation or agglomeration of solids in the shear conditions and time period the suspension is used in a coating process. The suspension stability depends, for instance, on particle size distribution (finer particles are easier to stabilize: too large particles cannot be stabilized) and on particle-particle interactions. Generally repulsive forces are needed between the particles, such as electrostatic repulsion or steric repulsion, surfactants and polyelectrolytes being examples of how particle—particle repulsion is achieved.

With regard to rheology and viscosity, the graphene/graphene oxide suspension should preferable be shear thinning and it should not be dilatant. In other words, the shear viscosity of the graphene/graphene oxide suspension should not increase with application of shear rate as in a dilatant. The viscosity should stay relatively stable during the coating process (as a function of time). Each coating process requires an adapted viscosity level for good quality coating. In general, the coating suspension of graphene and/or graphene oxide is prepared to its highest practical solids content that still allows reaching correct rheological behavior (runnability & coating surface quality). In some cases however the coating solids content may be lowered in order to reduce the coat weight.

As to surface tension, some coating methods such as curtain coating and slide applicators are sensitive to surface tension. For a good runnability the suspension must be prepared within a defined viscosity-surface tension window.

The graphene bonding liquid is used optionally, depending on the properties of the paper substrate. The graphene bonding liquid is a liquid allowing adhesion (net attractive force) between the adhesive (in the graphene bonding liquid) and graphene particles. An aqueous liquid is probably the most realistic alternative, at least for large scale manufacturing. Without bonding liquid, standard paper may be unsuitable as a substrate. Alternatively, suitable paper substrates are commercially available and may be used, in which case the graphene bonding liquid is not required. Therefore, graphene bonding liquid is primarily an agent that, when applied, may be used to make standard paper suitable as a substrate for subsequent application of the graphene and/or graphene oxide suspension.

In one embodiment, the graphene bonding liquid may be an aqueous solution or suspension containing common binders used for paper treatment, including—but not limited to—water soluble polymers such as polyvinyl alcohol (PVOH), starch, modified starch, or latexes such as latexes of polyacrylate or latexes of polyvinylidene dichloride (PVDC). In some embodiments, the graphene bonding liquid may be in the form of a liquid, mixture of liquids, solution, suspension, emulsion or colloid.

Furthermore, the graphene bonding liquid may include particular agents, which have an affinity for graphene/graphene oxide, having non-covalent interactions with graphene/graphene oxide and with the substrate leading to, for example, surface adsorption or π-π stacking. These agents may be, for example, ionic, anionic, or zwitterionic surfactants and/or polymers, including but not limited to specialized pyrene derivatives such as 1-aminopyrene, pyrenesulfonic acid hydrate, pyrenesulfonic acid sodium salt, pyrenetetrasulfonic tetra acid tetra sodium salt hydrate, 1-pyrenebutyric acid, various (pyrenyl)alkyl sulfonates, derivatives of imidazole-linked pyrenes, and pyrene-terminated or pyrene-functionalized polymers and copolymers.

It is conceived that when the graphene/graphene oxide particles come into contact with the graphene bonding liquid, the particles are subjected to an attractive force from the graphene bonding liquid, holding the particles together. The graphene bonding liquid orders the particles to a layer on the surface. The graphene bonding liquid binds together the particles of graphene/graphene oxide.

The characteristics of suitable paper substrates which do not require the use of bonding liquid, when coated with conventional paper coating methods, include:
  low water absorption, i.e. Cobb value less than 50 $g/m^2$, preferably less than 30 $g/m^2$, more preferably less than 10 $g/m^2$, advantageously about 2 $g/m^2$ or less, for a 60 sec test made in accordance with ISO 535/2014,
  good dimensional stability, sufficient to avoid swelling of cellulosic and undesired dimensional changes to the paper, with can result in wrinkles or other undesirable properties in the coated paper
  wettability by graphene/graphene oxide suspension; for example, if the paper support is too hydrophobic, it is incompatible with an aqueous graphene/graphene oxide suspension,
  porosity low enough relative to graphene/graphene oxide particle sizes in the suspension, avoiding interpenetration/intercalation of the pulp matter with graphene/graphene oxide, rather than formation of a layer upon it, An example of a suitable paper substrate is Spantex™ Impregnated Balancing Foil.

When the paper is heated the liquid evaporates. The liquid to be evaporated is the graphene bonding liquid and the liquid used to make the suspension of graphene/graphene oxide. In one embodiment essentially all liquid is evaporated by heat. In an alternative embodiment only a part of the liquid is evaporated in step c). During the heating to evaporate liquid, the graphene/graphene oxide particles are drawn together and to the paper so that a closer packed graphene/graphene oxide layer is formed. When the liquid evaporates the distance between the graphene/graphene oxide particles decreases so that a graphene/graphene oxide layer is formed where the particles are closer to each other compared to before the evaporation.

When the layer of graphene/graphene oxide particles and the paper is subjected to pressure it is conceived that a pressure is applied on both sides of the paper. The paper is pressed between two objects. This is typically made by feeding the paper between two rolls so that a pressure is applied on the paper. Optionally, one roll or both of the rolls may be heated whereby the layer of graphene/graphene oxide particles and the paper is subjected to pressure under heat. When the pressure is applied the layer of graphene/graphene oxide is further compressed and is more closely bonded to the paper. Further, the individual graphene/graphene oxide particles may to some extent form a more covering graphene/graphene oxide layer.

It has been found that pressure alone, regardless of heat during the calendering, greatly improves alignment of the graphene and/or graphene oxide layer, promoting continuity and structural order, for example by reducing the amount of rotational faulting in the layered graphene coating. This step results in an improved graphene/graphene oxide layer with improved properties.

Annealing is a common term used when speaking of the production or post-production of graphene/graphene oxide films or graphene/graphene oxide layers. Annealing is generally a thermal process, and is common in the art for treating graphene/graphene oxide layers and films, implemented most frequently as a cleaning process to remove residual contaminants from the binding liquid or graphene/graphene oxide suspension (for example from surfactants, rheology modifiers, stabilizers), which otherwise effect the performance properties of the graphene/graphene oxide layer (such as its electrical, thermal, or chemical properties) and are therefore capable of improving the properties of the formed graphene/graphene oxide layer. Thermal annealing can be carried out at various temperatures, the effect of which is dependent upon atmosphere (for example air, gas, inert gas (eg $N_2$), gas mixtures, for example $Ar/H_2$, inert gas, or vacuum) and can be carried out at various lengths of time and at various temperatures often at or between, for example, about 175-500° C.

In this way, the drying step not only removes liquids such as water or solvents, more generally graphene bonding liquid and/or suspension liquid, but also constitutes a thermal annealing step and improves the graphene/graphene oxide layer properties by removing residual contaminants introduced during formation of the graphene/graphene oxide layer.

Beyond conventional thermal annealing by convection, other advanced annealing techniques according to this invention may confer further improved properties to the graphene/graphene oxide layer. These advanced annealing techniques include, for example, photonic annealing, laser annealing, or microwave annealing.

Additional, specialized annealing steps at higher temperatures, such as those achieved using a laser, may provide localized instantaneous heating of the graphene/graphene oxide layer to temperatures in range of 2000° C., and may have pronounced effects on the structure of a formed graphene/graphene oxide layer—improving factors such as the continuity of the sheet, homogeneity of its composition, enhanced flatness—essentially improving the properties that arise from the unique properties that arise from the 2-dimensional (planar) physiochemical nature of graphene/graphene oxide based layers and films, therefore improving the formed graphene/graphene oxide layer. The effects may be so pronounced that they may be observed macroscopically, where improvement to material properties like electrical conductivity are observed, or even at the molecular level using advanced imaging techniques (like SEM)

These advanced annealing methods—particularly laser annealing—not only enhance the effect of conventional annealing, more thoroughly removing residual contaminants such as stabilizer or polymer additives from graphene and/or graphene oxide suspension, which may not have been entirely removed during the drying step where annealing takes place at much lower temperatures. Removal of contaminants takes place by thermal degradation, encompassing various mechanisms the action of heat through various processes dependent on conditions and the nature of the impurity but all having in common the formation of smaller molecules or degradation into monomers, which may volatilize if small enough. These advanced annealing methods—particularly laser annealing—also result in a flattening effect with reduced structural disorder (fewer in-plane or out-of-plane structural defects), fewer discontinuous regions in the graphene/graphene oxide layer, providing an improved and more continuous layer of graphene/graphene oxide.

When the graphene/graphene oxide layer is subjected to laser light to heat the graphene/graphene oxide, it is conceived that laser light of any suitable wavelength irradiates the graphene/graphene oxide to heat it. It is important that the heating only takes place for a very short moment so that the graphene/graphene oxide is heated, but so that the paper is not heated to any major extent. In one embodiment of the present invention the paper is not heated above 250° C. in order not to cause any significant impact on the properties of the paper. During the quick heating to high temperature (typically above 2000° C.) the graphene/graphene oxide is bonded together to an essentially covering graphene/graphene oxide layer. The graphene/graphene oxide is heated to a temperature in the interval of 1500-3000° C. One way of realizing the quick heating is to use a powerful laser which sweeps rapidly over the surface so that each spot is only heated for a very short moment. The quick laser irradiation has the effect that the graphene/graphene oxide is heated to a high temperature, whereas the underlying paper is not heated to any major extent, or at least not to any detrimental extent. Any suitable laser source can be used as long as it can deliver a short and sufficiently powerful light to the graphene/graphene oxide particles. Examples of lasers include both continuous lasers and pulsed lasers. The wavelength of the laser is preferably selected so that the heating of graphene/graphene oxide is efficient. A mirror can be utilized to sweep the laser over the paper surface.

In order to facilitate that the underlying paper is not heated to a temperature which may destroy the paper (more than 250° C.), the laser irradiation is in one embodiment carried out in a cooled compartment and/or the paper is cooled from the side where graphene/graphene oxide layer is not applied, i.e. at the face of the paper opposite to the graphene/graphene oxide layer.

The heat from the spot that is heated with laser dissipates to the surroundings, both adjacent graphene/graphene oxide layer and the underlying paper. Since the heating is so quick and on such a small area the heat energy is small and when the heat energy dissipates to the underlying paper the temperature of the underlying paper will not give any negative effects on the paper. Thus it is possible to heat the graphene to above 2000° C. for a short while on a small area while the underlying paper is not negatively affected. In one embodiment the laser heating is made in room temperature without additional cooling, the heat is then dissipated to the underlying paper and the surroundings so that the temperature does not reach too high a value. It must be ensured that the laser irradiation is not carried out under too long time for each spot, otherwise the paper may be heated too much. The power of the laser also has to be considered. A short heating time may be achieved by sweeping the laser over the paper and by adjusting the sweep speed so that the graphene is heated sufficiently, but so that the paper is not heated too much.

Without wishing to be bound by any scientific theories the inventor speculate that the laser irradiation both bonds the graphene/graphene oxide particles together and increases the bonding to the underlying paper. After the laser treatment the graphene/graphene oxide coating becomes much more uniform and more homogenous.

In one embodiment the graphene bonding liquid and the suspension liquid is the same and steps b1) and b) are carried out in one step. In this embodiment a separate graphene bonding liquid is not applied, instead the liquid in which the graphene particles are suspended act as graphene bonding liquid.

In one embodiment the graphene bonding liquid is water, optionally with surface active additives to adjust the surface tension. In one embodiment the graphene/graphene oxide particles are suspended in water.

In another embodiment, a suitable paper substrate is used, so that a graphene bonding liquid is not required, and the graphene and/or graphene oxide suspension may be applied directly.

A particularly advantageous embodiment of this invention employs a suspension containing a mixture of both graphene and graphene oxide.

In one embodiment steps b), c), and d) are repeated until a layer of desired thickness of graphene/graphene oxide is obtained. In one embodiment the steps are carried out twice.

In one embodiment, steps b), c), and d) are repeated until a layer of desired thickness of graphene/graphene oxide is obtained. In one embodiment the steps are carried out at least twice.

In one embodiment steps b), and c) are repeated until a layer of desired thickness of graphene/graphene oxide is obtained. In one embodiment the steps are carried out at least twice.

In one embodiment steps b1), b), and c) are repeated until a layer of desired thickness of graphene/graphene oxide is obtained. In one embodiment the steps are carried out at least twice.

In one embodiment steps b1), b), c) and d) are repeated until a layer of desired thickness of graphene/graphene oxide is obtained. In one embodiment the steps are carried out at least twice.

In another embodiment, the thickness of the layer is controlled by the concentration of graphene/graphene oxide in the suspension. By adjusting the concentration of graphene/graphene oxide in the suspension also the number the steps b), c), at least, need to be repeated to reach the desired thickness of graphene/graphene oxide layer may be controlled.

In another technique, the thickness of the coating is controlled by the technique employed to apply the suspension to the substrate. Various techniques are known to persons of ordinary skill in the art, for example blade coating, rod coating, curtain coating, film press coating, foam coating and spray coating.

It is an advantage of the invention that the thickness of the graphene/graphene oxide may be adjusted as desired before optionally performing step e) annealing. By adjusting the thickness of the graphene/graphene oxide before annealing it is possible to adjust the thickness and properties of the finished coating.

In one embodiment, the drying step is carried out through non-contact heating, first by radiative heating, for example heating by Infra-Red lamps, followed by convective heating, for example by an air flotation dryer.

In one embodiment, the drying step is carried out through non-contact heating at temperatures of about 300° C.

In one embodiment, the drying is completed entirely through non-contact heating

In one embodiment, the non-contact heating is optionally followed by contact heating (i.e. conductive heating), for example using a contact drum dryer.

In one embodiment the layer of graphene/graphene oxide and the paper is subjected to pressure and heat in a calender.

In one embodiment the layer of graphene/graphene oxide and the paper is subjected to a temperature of 100-300° C., preferably to 200-250° C. in step d).

In an alternative embodiment, the layer of graphene/graphene oxide and the paper is subjected to pressure without heat in a calender In one embodiment the layer of graphene/graphene oxide and the paper is subjected to at least one of super calendering, soft nip calendering, hard nip calendering, thermosoft calendering, shoe calendering, metal belt calendering, and multi-nip calendering.

In one embodiment the layer of graphene/graphene oxide and the paper is subjected to pressure in multiple steps, where the pressure increases for each step. In one embodiment this is carried out in a super calender with several rolls where the pressure is increased for every roll.

In one embodiment, annealing in step e) is carried out with conventional thermal annealing by convection, using a drying oven in air atmosphere at 275° C. for 30 minutes.

In another embodiment, annealing in step e) is carried out using photonic annealing, by means of a Xenon Flashlamp as the pulsed radiation source, using a power density of 4 $J/cm^2$ and a flash time of 300 microseconds, allowing the coating layer to reach extremely high temperatures while the substrate is only heated to a fraction of the coating temperature during the flash, followed by cooling times on the order of milliseconds.

A particular advantage of photonic annealing is that it is amenable to substrates sensitive to thermal degradation. This is possible not only because the heating and cooling is completed so quickly, but also because many such substrates do not readily absorb much of the light emission from photonic annealing devices such as a Xenon Flashlamp. This allows surface coatings to be heated to extremely high temperatures upon inexpensive substrates that can be damaged by heat. For example, photonic annealing by Xenon flash can be used on substrates such as paper or polyethyleneterepthalate (PET), polyethylene (PE), polycarbonate (PC), and more.

In one embodiment, annealing in step e) is carried out with a conventional 1000 W microwave, and is performed using pulse time of about 2 seconds or less.

In one embodiment, annealing in step e) is carried out in two steps, first with conventional thermal annealing at 375-500° C. in a vacuum oven, followed by microwave annealing using a conventional 1000 W microwave, performed using several pulses of about 1-2 seconds each.

In one embodiment step e) is performed by laser annealing and is carried out in oxygen free environment. If there is oxygen present during heating there is a significant risk that the graphene will oxidize. In general oxidation is not desired, so in most cases the environment in step e) should be oxygen free. The word oxygen free does not exclude that small amounts of oxygen can still be left even if care has been taken to remove as much oxygen as possible.

There are several ways of creating an oxygen free environment. In one embodiment step e) is performed by laser annealing and is carried out in a vacuum. In one embodiment step e) is performed by laser annealing and is carried out in an inert gas. Even if step e) is performed by laser annealing and is carried out in a vacuum or in an inert gas there still may be small amounts of oxygen left. Remaining amounts of oxygen should preferably be insignificant and so low that they do not affect the result adversely.

In one embodiment the graphene/graphene oxide is heated to a temperature in the interval 2000-2500° C. in step e) by laser annealing. In one embodiment the graphene/graphene oxide is heated to a temperature above 2000° C. in step e).

In one embodiment the paper is cooled during step e) of laser annealing. In one embodiment graphene/graphene oxide is applied on one side of the paper during step b) and the paper is cooled during step e) from the side on which graphene/graphene oxide is not applied. The paper may then be on a cooled surface.

In one embodiment step e) is performed by laser annealing and is carried out in a cooled atmosphere. In one embodiment the finished paper is cooled after step e).

In one embodiment the paper for either step b1) or step b) is fed from a roll. In one embodiment the finished paper is rolled up on a roll after step e). This facilitates manufacturing the graphene-coated paper in an industrial scale. In one embodiment the method is carried out as a continuous process.

In a further embodiment of the present invention step a), i.e. the preparation of a suspension of graphene/graphene oxide in a suspension liquid is performed off-line, i.e.

separate from the actual coating process. In a further embodiment of the present invention step d), i.e. subjecting the graphene/graphene oxide layer and the support to pressure is performed off-line, in other words, the graphene/graphene oxide layer and the support are rolled on a roll and taken to another position for calendering. In a yet further embodiment the support is coated on both sides with the graphene/graphene oxide suspension. The coating may be performed in a single sequence of coating and drying steps or such that the support coated on one side is rolled on a roll and the unrolled for coating on the other side, i.e. off-line.

In accordance with a second preferred embodiment of the present invention the above discussed method may be utilized, not only for producing a graphene-coated paper but also for producing a graphene/graphene oxide layer. The manufacture of the graphene/graphene oxide layer is quite similar to the manufacture of the graphene-coated layer, except for the fact that in place of paper a specific support is used. The support may be chosen from a group of alternative substrates, selected based on the desired function and properties of the final material but also their suitability to this manufacturing process. The support may be chosen from a group of alternative substrates, selected based on the desired function and properties of the final material but also their suitability to this manufacturing process. Examples include cellulosic or artificial fiber based substrates, coated and impregnated papers and release papers, foils, organic or inorganic films, polymer substrates such as PVDC, polymer dielectrics exhibiting spontaneous dipole moments, and substrates with piezoelectric properties.

In accordance with a yet further embodiment of the present invention a graphene/graphene oxide-coated support is produced. The graphene/graphene oxide-coated support having a coating comprising a layer of graphene/graphene oxide the layer having a basis weight of 2-50 $g/m^2$, preferably 4-35 $g/m^2$, more preferably 5-20 $g/m^2$.

In a further embodiment the support for the graphene/graphene oxide-coating comprises cellulosic or artificial fiber based substrates, coated and impregnated papers and release papers, foils, organic or inorganic films, polymer substrates such as PVDC, polymer dielectrics exhibiting spontaneous dipole moments, and substrates with piezoelectric properties.

In a further embodiment the graphene/graphene oxide layer is formed of a coherent 2-dimensional planar structure.

In a further embodiment the support for graphene/graphene oxide-coated support has a Cobb value, the Cobb value of the non-coated support being less than 20 $g/m^2$, preferably less than 10 $g/m^2$ when using conventional coating processes like film press coating, rod coating, curtain coating and blade coating.

All the described alternative embodiments above or parts of an embodiment may be freely combined without departing from the inventive idea as long as the combination is not contradictory.

Other features and uses of the invention and their associated advantages will be evident to a person skilled in the art upon reading the description and the following examples.

EXAMPLE 1

Graphene stock suspension acquired from a supplier consists of graphene, graphene oxide and likely a certain quantity of residual graphite. The stock graphene suspension is in itself not suitable for use as a coating and must be further stabilized and reformulated by suitable rheology modifier additives to improve the stability sufficiently so as to make the graphene/graphene oxide suspension suitable for industrial coating operations. The graphene/graphene oxide suspension used for coating is prepared to a desired solids content and rheological properties from a stock suspension by adding necessary other components. The graphene/graphene oxide suspension is produced from the stock suspension and necessary other components under high shear mixing using a polyacrylic polymer as dispersant. The graphene/graphene oxide suspension may be prepared up to 15% solids. One of the limiting factors is that the higher the solids the higher is the graphite content so the objective is not to increase the solids further. Then the graphene/graphene oxide suspension is applied to the substrate to provide a graphene/graphene oxide coating with a basis weight of about 20 $g/m^2$.

In successful tests following exemplary formulations were used:

For Rod Application

| Coating formulation | | |
|---|---|---|
| Graphene (suspended in water) | pph (parts per hundred) | 100 |
| Sterocoll DF3 (Polyacryl amide based rheology modifier) | pph | 3 |
| Lumiten I-SC (Sulphosuccinate/isotridecanol ethoxylate based surfactant) | pph | 0.5 |
| Rheocoat 35 (Acrylic thickener) | pph | 3.5 |
| Solids content | % | 10.8 |
| Viscosity (Brookfield 100 rpm) | mPs | 1250 |
| pH | | 9.3 |
| Temperature | ° C. | 21 |

For Curtain Application

| Coating formulation | | |
|---|---|---|
| Graphene (suspended in water) | pph | 100 |
| Sterocoll DF3 (Acrylic thickener) | pph | 3 |
| Lumiten I-SC (Sulphosuccinate/isotridecanol ethoxylate based surfactant) | pph | 0.5 |
| Solids content | % | 4.3 |
| Viscosity (Brookfield 100 rpm) | mPs | 73 |
| pH | | 6.3 |
| Temperature | °C. | 21 |

EXAMPLE 2

To an unbleached kraft paper substrate having a basis weight about 50 $g/m^2$, a polyacrylate latex (Acronal 360D) is applied as the graphene bonding liquid, in the amount of about 10-15 $g/m^2$ in basis weight. Thereafter the paper substrate is coated with the coating formulations and applications discussed in Example 1.

The coated paper substrate is dried first by rapid IR-heating followed by air flotation drying at 300° C. to final moisture of 3%.

Pressure is applied to the dried coated paper substrate using a multi-nip hard calender.

The result was a graphene/graphene oxide-coated paper substrate exhibiting desirable thermally conductive properties. The following measurements were made:

| Measurement Electric surface resistance probe tips 15 mm apart from one another | Calendered | Non-calendered |
|---|---|---|
| Resistance (Ω) - rod application | 14.5-15.5 | 61.0-65.0 |
| Resistance (Ω) - curtain application | 10-16 | 500-900 |

It is to be understood that this invention is not limited to the particular embodiments shown here. The embodiments are provided for illustrative purposes and are not intended to limit the scope of the invention since the scope of the present invention is limited only by the appended claims and equivalents thereof.

The invention claimed is:

1. A method of manufacturing a graphene and graphene oxide layer comprising the steps of:
   a) preparing a suspension of a mixture of graphene and graphene oxide comprising a mixture of flake shaped graphene and -graphene oxide particles in a suspension liquid,
   wherein the suspension liquid is water wherein the suspension is free of nano-fibrillated cellulose,
   b) coating the suspension on a paper support,
   c) heating the suspension and the support to evaporate at least a part of the suspension liquid for forming a layer of graphene and graphene oxide on the support, and
   d) pressing the layer of graphene and graphene oxide and the support between two objects.

2. The method according to claim 1, comprising, before step b), the step b1) of applying a graphene bonding liquid on the support, and, in step c) allowing at least a part of the graphene bonding liquid evaporate wherein the bonding liquid facilitates ordering of the particles on the surface and binding of the particles together.

3. The method according to claim 1, comprising, in step c), subjecting the graphene/graphene oxide layer to a non-contact or contact heat source to perform the drying process by evaporating at least a part of the suspension liquid.

4. The method according to claim 2, wherein the graphene bonding liquid and the suspension liquid is the same and steps b1) and b) are carried out simultaneously.

5. The method according to claim 1, wherein the support for step b1) or b) is fed from a roll.

6. The method according to claim 1, wherein, in step d), the graphene/graphene oxide layer and the support is subjected to pressure and/or heat in a calender.

7. The method according to claim 1, wherein, in step d), the graphene/graphene oxide layer and the support is subjected to at least one of super calendering, soft nip calendering, thermosoft calendering, hard nip calendering, shoe calendering, metal belt calendering, and multi-nip calendering.

8. The method according to claim 1, wherein the graphene/graphene oxide layer and the support is subjected to pressure in multiple steps, where the pressure increases for each step.

9. The method according to claim 1, wherein, after step d), in step e), the graphene/graphene oxide layer is subjected to annealing to heat the graphene/graphene oxide layer.

10. The method according to claim 9, wherein step e) is carried out in a cooled atmosphere.

11. The method according to claim 9, wherein step e) is carried out in oxygen free environment.

12. The method according to claim 9, wherein step e) is carried out in a vacuum.

13. The method according to claim 9, wherein step e) is carried out in an inert gas.

14. The method according to claim 9, wherein, in step b) graphene/graphene oxide is applied on one side of the support and wherein, in step e), the support is cooled from the side on which graphene/graphene oxide is not applied.

15. The method according to claim 9, wherein, in step b) graphene/graphene oxide is applied on both sides of the support.

16. The method according to claim 15, wherein step e) is divided into two stages, in a first stage a first side of the coated support is cooled and the graphene/graphene oxide layer on the opposite, second side is subjected to annealing, and in a second stage where the second side of the support is subjected to cooling and the graphene/graphene oxide layer on the first side to annealing.

* * * * *